United States Patent [19]

Braun et al.

[11] Patent Number: 5,088,273
[45] Date of Patent: Feb. 18, 1992

[54] LAWNMOWER HANDLE ASSEMBLY

[75] Inventors: Daniel E. Braun; Robert K. Mitchell; Casimir F. Laska, all of Brookfield, Wis.

[73] Assignee: Briggs & Stratton Corporation, Wauwatosa, Wis.

[21] Appl. No.: 633,251

[22] Filed: Dec. 21, 1990

[51] Int. Cl.$^5$ .......................... A01D 34/82; F02N 3/02
[52] U.S. Cl. ..................................................... 56/10.5
[58] Field of Search ...................... 56/10.5, 10.8, 11.3, 56/11.7, 11.8, DIG. 18; 123/179 SE, 185 A, 185 B, 185 BB, 185 C; 74/483 R

[56] References Cited

U.S. PATENT DOCUMENTS

| | | | |
|---|---|---|---|
| 2,912,966 | 11/1959 | Mitchell | 123/179 SE |
| 3,228,177 | 1/1966 | Coates . | |
| 4,003,190 | 1/1977 | Braun et al. | 56/10.5 |
| 4,037,389 | 7/1977 | Harnkess | 56/11.3 |
| 4,221,108 | 9/1980 | Owens | 56/11.3 |
| 4,397,274 | 8/1983 | Tarnedde | 123/185 BB |
| 4,419,857 | 12/1983 | Smith | 56/11.3 |
| 4,428,180 | 1/1984 | Carlson | 56/11.3 |
| 4,433,530 | 2/1984 | Schaefer | 56/11.8 |
| 4,458,472 | 7/1984 | Christopherson | 56/10.5 |
| 4,466,308 | 8/1984 | Kester et al. | 56/10.5 X |
| 4,531,347 | 7/1985 | Schutz | 56/10.5 |
| 4,704,847 | 11/1987 | Greider et al. | 56/10.5 |
| 4,711,077 | 12/1987 | Kutsukake et al. | 56/320.2 |
| 4,753,062 | 6/1988 | Roelle | 56/10.5 |

FOREIGN PATENT DOCUMENTS

| | | |
|---|---|---|
| 3033346 | 4/1982 | Fed. Rep. of Germany . |
| 3406330 | 8/1985 | Fed. Rep. of Germany . |
| 224957 | 11/1985 | Japan . |

Primary Examiner—Stephen J. Novosad
Attorney, Agent, or Firm—Andrus, Sceales, Starke & Sawall

[57] ABSTRACT

A lawnmower handle assembly is disclosed for manually-starting lawnmowers in which the starter rope handle is retained by the bale lever. The rope handle is preferably retained by an aperture in the bale lever, with the starter rope passing through the aperture. The handle assembly enables the starter rope handle to be more accessible to the operator during starting, and decreases the time required for the lever to engage an ignition or blade stopping mechanism when the lever is released.

21 Claims, 3 Drawing Sheets

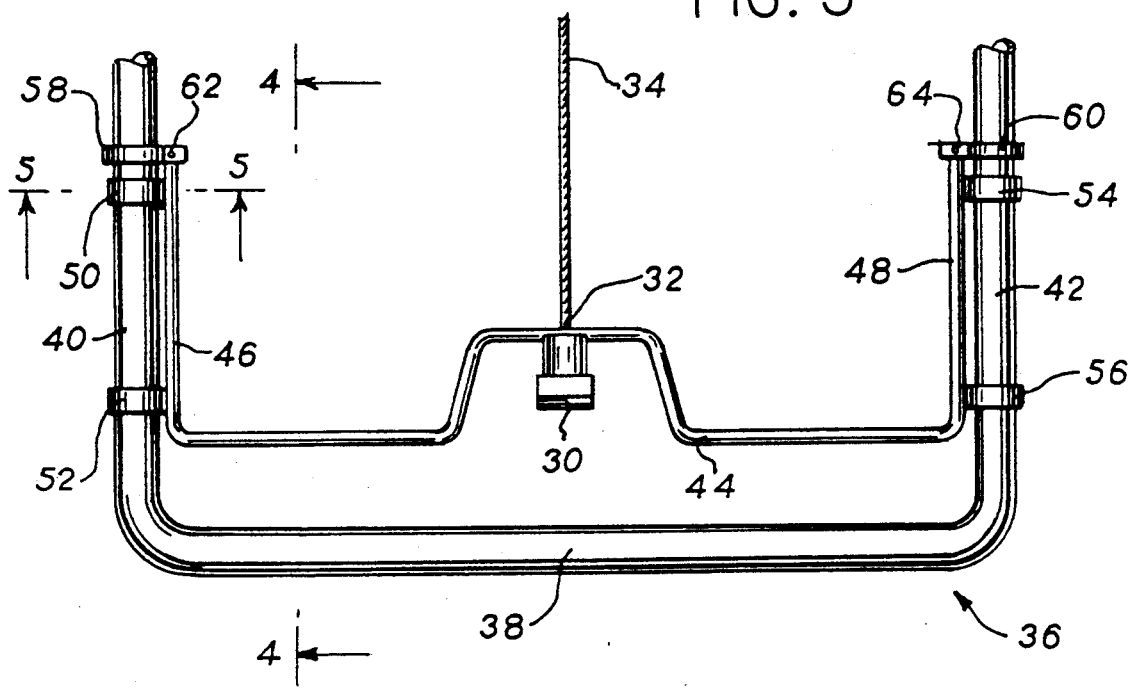
FIG. 3
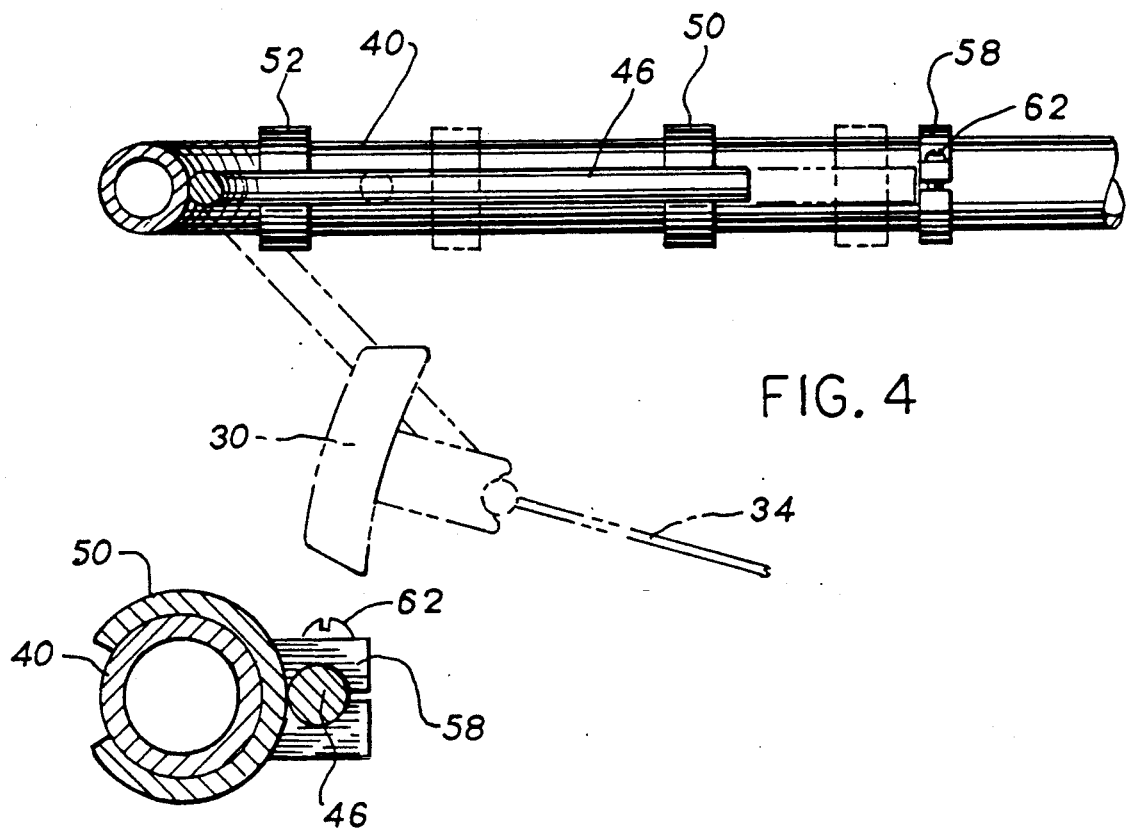
FIG. 4
FIG. 5

LAWNMOWER HANDLE ASSEMBLY

BACKGROUND OF THE INVENTION

This invention relates to lawnmowers, and more particularly to handle assemblies for lawnmowers.

A wide variety of lawnmower handle assemblies are known which enable the lawnmower operator to guide the lawnmower while cutting grass. Lawnmower handle members typically are shaped like an inverted U, with the opposing legs of the U-shaped handle member being connected to a handle cross bar and being attached to the lawnmower chassis.

More recent lawnmower handle assemblies include a rotatable bale safety lever which is held or gripped by the operator during lawnmower operation along with the handle cross bar. The rotatable bale lever is typically connected to either a brake cable or to an ignition kill switch so that release of the bale lever assists in stopping the rotating cutting blade.

Lawnmower handle assemblies are also known for manually-started lawnmowers in which a bracket attached to one of the handle member's legs is used to hold the starter rope handle. The purpose of the bracket is to enable the operator to pull-start the engine without having to bend down to reach the starter rope handle, which would otherwise be located near the starter rewind housing on the lawnmower chassis.

However, the operator must still reach a substantial distance to grasp the starter rope handle even if the rope handle is located on such a bracket. The operator must then use a relatively long arm movement to pull the rope handle and start the engine. This movement was necessary in prior art lawnmowers since a longer arm movement or pull stroke was required to start engines.

Another disadvantage of these prior art arrangements is that they typically require the starter rope to engage a pulley or other guide member to guide the travel of the starter rope. Such guide members and pulleys introduce friction forces onto the starter rope during pull-starting, thereby further increasing the operator's effort required to start the engine.

SUMMARY OF THE INVENTION

A handle assembly is disclosed for manually-starting lawnmowers of the type having a starter rope and a rope handle attached near the end of the starter rope. The handle assembly according to the present invention includes a handle member attached to the lawnmower chassis adapted to be held by the operator, a lever that engages the handle member and moves relative to the handle member, and a retainer means attached to the lever for retaining the starter rope handle.

The handle member may be shaped substantially like an inverted U and has opposing first and second handle legs and a handle cross bar connecting the two handle legs. The bale lever is preferably a bar having a first lever leg that rotatably engages a first leg aperture in the first handle leg, and having an opposite second lever leg that rotatably engages a second leg aperture in the second handle leg. A stop means such as a tab may be attached to one or more of the handle legs for limiting the rotation of the lever.

The retainer means preferably includes an aperture through which the starter rope passes, with the starter rope handle resting on the lever. The retainer means is preferably located at about the midpoint of the lever. The lever is preferably shaped such that the portion of the lever where the retainer means is located is farther from the handle member than the adjacent sections of the lever when the lever is in an up or run position. This configuration provides clearance for the operator to grip the starter rope handle when the bale lever is in an up position.

To start the engine, the operator rotates the bale lever until it is in an up position, and simultaneously holds the bale lever and the handle cross bar with one hand. With the other hand, the operator grasps the starter rope handle and pulls it to manually start the engine. With modern easy-starting engines, the position of the starter rope handle during starting still permits sufficient arm movement for pull-starting while enabling the operator to reach the handle without bending.

In a second embodiment, the bale lever itself has opposing first and second lever legs connected by a lever cross member. When the lever cross member is gripped by the operator along with the handle cross bar, the first and second lever legs slide along the first and second handle legs respectively. The retainer means that retains the rope handle is located near the midpoint of the lever cross member. The lever cross member is shaped such that the portion of the lever cross member where the retainer means is located is farther from the handle cross bar than the adjacent portions of the lever cross member when the lever is in an up position. When the operator wishes to stop the engine, he simply releases the lever cross member. The recoil force imposed on the starter rope by the starter rewind mechanism assists the bale lever in its downward movement since the starter rope handle rests on the bale lever and on the retainer means. The increased speed of downward lever movement decreases the time required to stop the rotating blade since the downward movement of the bale lever typically engages a clutch, a brake mechanism, and/or an ignition shut-off system.

In a third embodiment, the handle assembly includes a bale lever that is substantially L-shaped. The retainer means is interconnected with the bale lever near a first end of the bale lever. The bale lever rotatably engages the handle member at a single pivot point located near the opposite second end of the lever. A tab on the bale lever may engage a stop switch contact inside the handle member while the engine is running. The tab disengages the switch contact when the lever is released to stop the engine.

It is a feature and advantage of the present invention to decrease the effort required to start a manually-starting lawnmower engine.

It is yet another feature and advantage of the present invention to make the starter rope handle more accessible to the operator during engine starting.

It is yet another feature and advantage of the present invention to decrease the time required to stop the rotating lawnmower blade.

These and other features and advantages of the present invention will be apparent to those skilled in the art from the following detailed description of the preferred embodiments and the attached drawings, in which:

BRIEF DESCRIPTION OF THE DRAWINGS

FIG. 3 is a top view of a second embodiment of the present invention.

FIG. 4 is a side view of the handle assembly, taken along line 4—4 of FIG. 3.

FIG. 5 is a cross sectional view of the first slide means of FIG. 3, taken along line 5—5.

DETAILED DESCRIPTION OF THE PREFERRED EMBODIMENT

Figure 1:
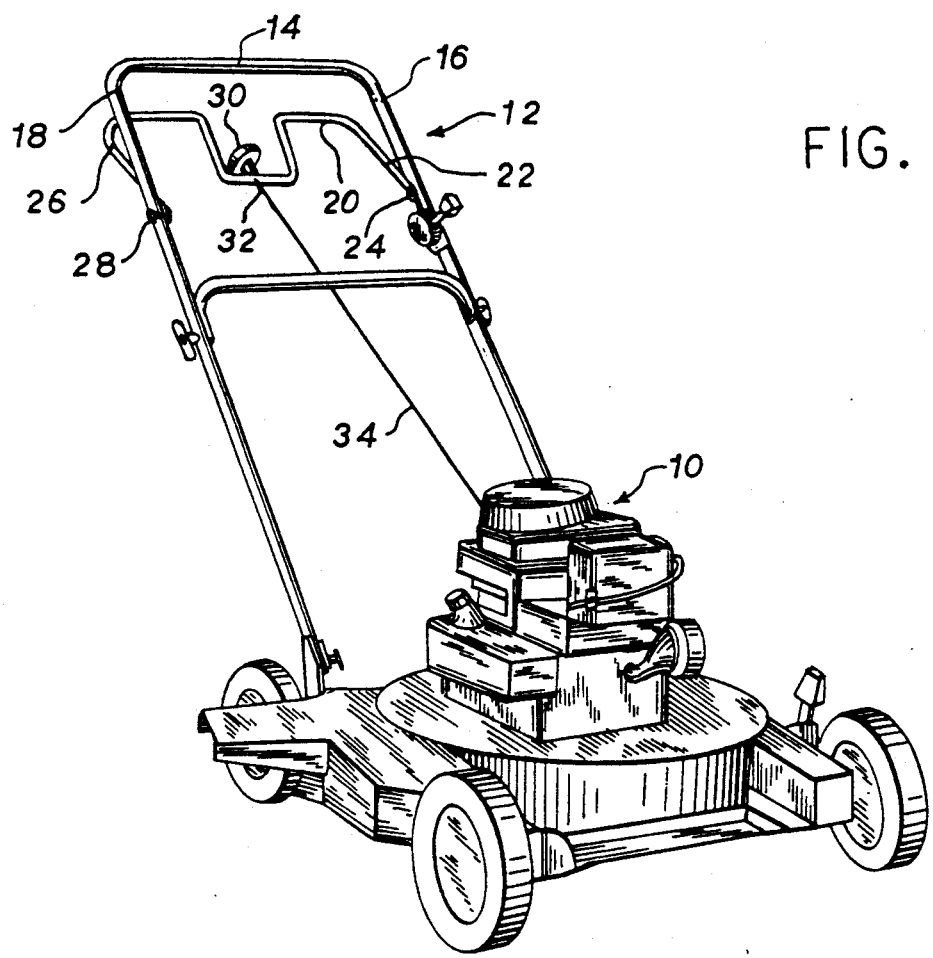
FIG. 1 is a perspective view of a lawnmower incorporating the preferred embodiment of the handle assembly according to the present invention.

FIG. 1 is a perspective view of the lawnmower incorporating a first embodiment of the present invention. In FIG. 1, the lawnmower consists of a lawnmower chassis 10 to which is connected a lawnmower handle assembly 12 that includes a handle member. The handle member consists of a bar 14, a first handle leg 16 attached to cross bar 14 and an opposing second handle leg 18 also attached to cross bar 14. As shown in FIG. 1, the handle member is generally shaped like an inverted U.

Handle assembly 12 also includes a rotatable bale lever 20 that moves relative to handle cross bar 14. Lever 20 is rotated in an upward direction to its run position and is gripped by the operator along with handle cross bar 14 to start and run the lawnmower. When the bale lever is in its run position, rope handle 30 is readily accessible to the operator for easy pull-starting of the engine. Lever 20 rotates in a downward direction to its stop position—depicted in FIGS. 1 and 2—when it is released by the operator. The downward rotation of lever 20 may be limited by a stop tab 23 attached to first handle leg 16. Release of lever 20 engages a brake, a clutch, and/or an ignition shut-off switch to help stop the rotating blade.

Bale lever 20 has a first lever leg 22 that rotatably engages a first leg aperture 24 in first handle leg 16. Similarly, a second lever leg 26 of bale lever 20 rotatably engages a second leg aperture 28 in second handle leg 18.

As depicted in FIG. 1, a starter rope handle 30 is retained by a retainer means 32 positioned near the midpoint of lever 20. Starter rope 34 to which rope handle 30 is attached, passes through the aperture in lever 20 which comprises retainer means 32. Of course, other retainer means could be used such as a bracket attached to lever 20 having a slot or aperture therein through which starter rope 34 passes.

As depicted in FIG. 1, retainer means 32 is located about the midpoint of lever 20, with lever 20 being shaped such that the portion of lever 20 where retainer means 32 is located is farther from handle cross bar 14 than the adjacent sections on both sides of said lever portion when the lever is rotated upward to its run position. The purpose of this shape is to allow lever 20 to be held by the operator along with cross bar 14, while still leaving enough room between handle 30 and cross bar 14 to enable the operator to grasp the rope handle and pull it to start the engine.

Figure 2:
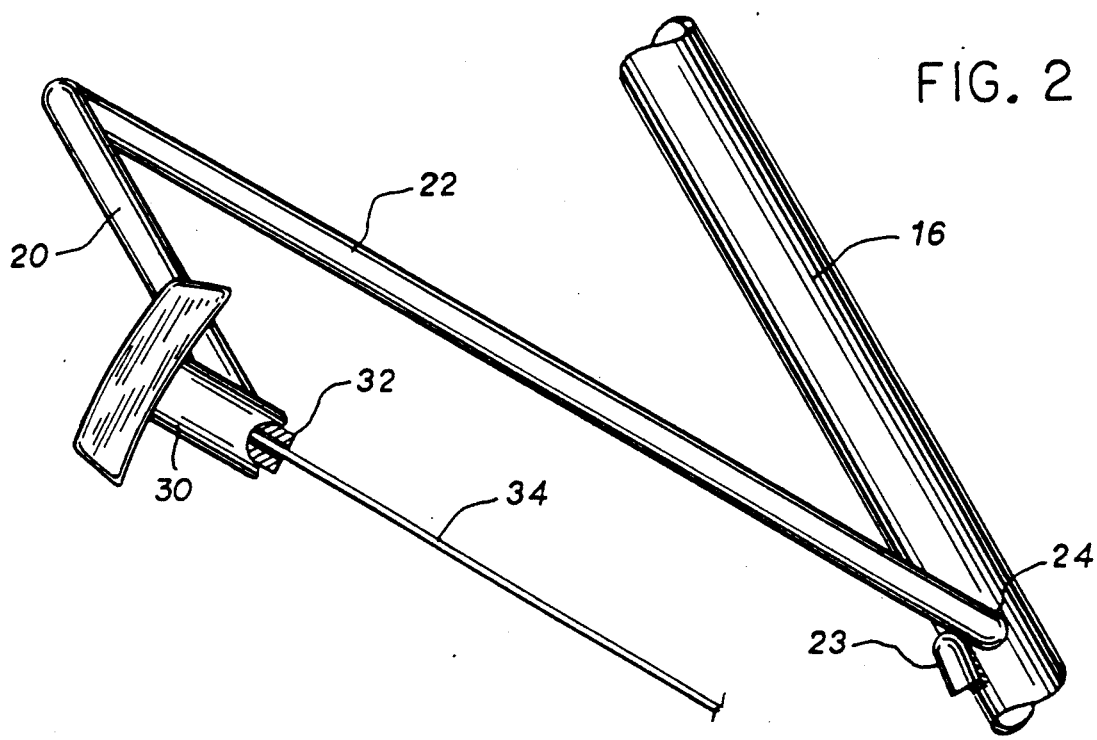
FIG. 2 is a side sectional view of the handle assembly shown in FIG. 1.

FIG. 2 is a partial side sectional view depicting the starter rope handle and retainer means of FIG. 1. In FIG. 2 as in all the FIGURES, corresponding parts having corresponding functions have been given the same numerical designations. Referring now to FIG. 2, starter rope 34 passes through retainer means 32, consisting of an aperture in bale lever 20. Rope handle 30 rests against bale lever 20 and retainer means 32. Rope handle 30 along with the rewind spring in the lawnmower engine and gravity, provide a downward force on lever 20. This downward force assists the relative rotational movement of lever 20 to its downward or stop position when lever 20 is released by the operator.

FIGS. 3-5 depict a second embodiment of the present invention. FIG. 3 is a top view of a handle assembly 36 including handle cross bar 38, first handle leg 40, an opposite second handle leg 42, bale cross member 44, a first bale lever leg 46, and a second bale lever 48. The handle assembly also includes a first slide means consisting of slide members 50 and 52, a second slide means consisting of slide members 54 and 56, a first stop means 58 for limiting the downward movement of second lever leg 46, and a second stop means 60 for limiting the downward movement of second lever leg 48. First stop means 58 is clamped around first handle leg 40 via a bolt 62. Similarly, second stop means 60 is clamped around second handle leg 42 via a bolt 64.

FIG. 4 is a cross-sectional view of the handle assembly 36 of FIG. 3, taken along line 4—4. FIG. 4 demonstrates the relative movement of bale lever 44, and more particularly of first lever leg 46 with respect to first handle leg 40.

FIG. 5 is a cross-sectional view of the handle assembly of FIG. 3, taken along line 5—5. FIG. 5 more clearly depicts the manner in which the bale lever slidably engages the handle assembly.

The operation of the second embodiment depicted in FIGS. 3-5 will now be described. When it is desired to start the lawnmower, lever cross member 44 is pulled upward towards handle cross bar 38. Lever cross member 44 then moves relative to cross bar 38 via slide members 50 and 52 which slide along the outer surface of first handle leg 40, and via slide members 54 and 56 which similarly slide along the outer surface of second handle leg 42. Since slide members 50 and 52 are attached to first lever leg 46, and since slide members 54 and 56 are attached to second lever leg 48, the upward movement of bale cross member 44 causes the entire bale lever to slide upwards towards handle cross bar 38 to the run position.

When the bale lever is in its up or run position, rope handle 30 is pulled by the operator to manually start the engine. After the engine starts, rope handle 30 is released, but lever cross member 44 is still held along with handle cross bar 38 to keep the engine running.

When the lawnmower is to be stopped, lever cross member 44 is released, causing the lever to move in a downward direction to its stop position. Slide members 50, 52, 54 and 56 enable the first and second lever legs to move relative to the first and second handle legs, respectively. The downward movement of first lever leg 46 is stopped by a first stop means 58. Similarly, the downward movement of second lever leg 48 is stopped by a second stop means 60. Gravity, the rope handle, and the rewind spring force assist the bale lever in its downward travel.

Figure 6:
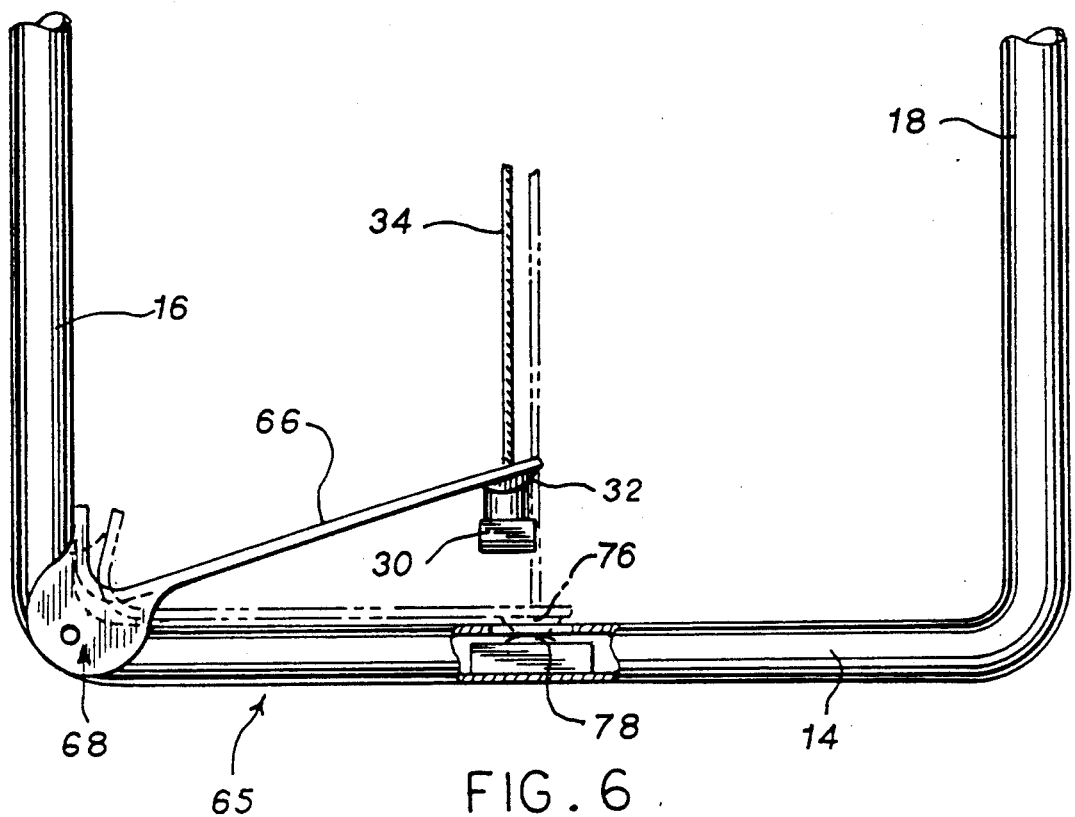
FIG. 6 is a top view of a third embodiment of the present invention.
Figure 7:
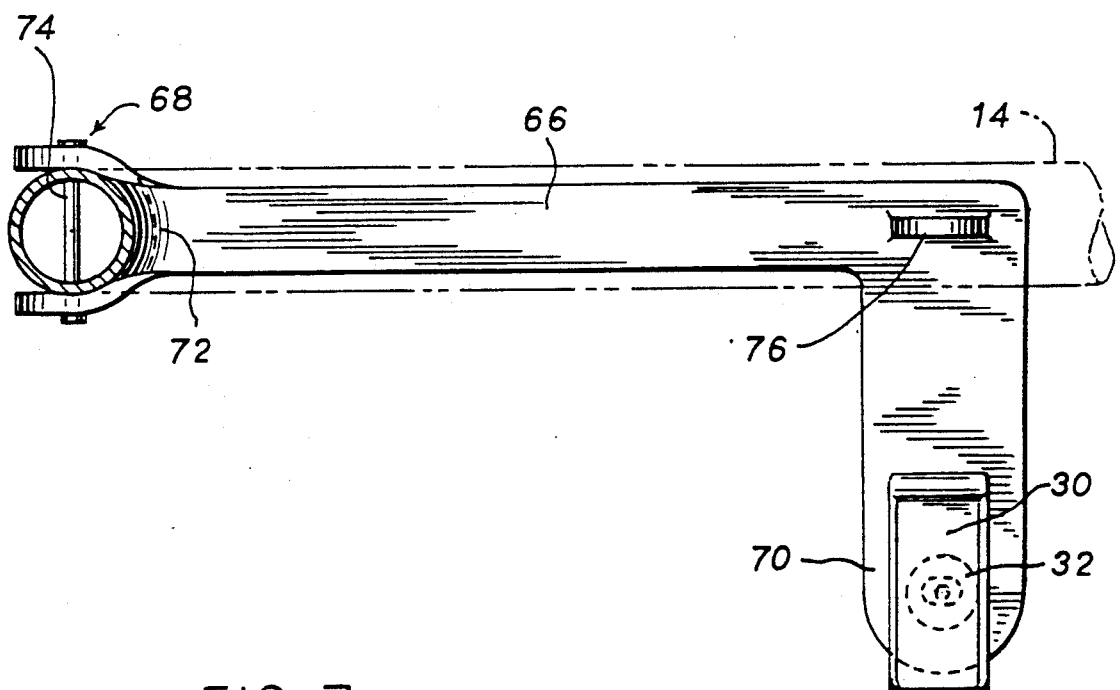
FIG. 7 is a front view of the third embodiment of FIG. 6, shown in partial section.

FIGS. 6-7 depict a third embodiment of the present invention in which handle assembly 65 includes a substantially L-shaped bale lever 66 that rotatably engages the handle member at a single pivot point 68. As best shown in FIG. 7, a first end 70 of lever 66 has retainer means 32, and a second end 72 of lever 66 rotates at pivot point 68. The handle assembly also includes a pin 74 that passes through both lever 66 and the handle near the junction of handle cross bar 14 and first handle leg 16. Lever 66 rotates about pin 74 when both lever 66 is gripped before engine starting, and also when lever 66 is released to stop the engine. The forces imposed by rope handle 30 and rope 34 cause lever 66 to rotate when the lever is released.

Lever 66 also includes an insulated tab 76 which engages a stop switch contact 78 inside handle cross bar 14 to permit the engine to start. Tab 76 need not be insulated. When lever 66 is released, tab 76 disengages switch contact 78, thereby stopping the engine.

While several preferred embodiments of the present invention have been shown and described, other alternate embodiments will be apparent to those skilled in the art and are within the intended scope of the present invention. Therefore, the invention is to be limited only by the following claims.

We claim:

1. A handle assembly for a lawnmower chassis, the lawnmower having a starter rope and a rope handle attached to the starter rope, said rope handle adapted to being pulled by a lawnmower operator, said handle assembly comprising:
   a handle member attached to said lawnmower chassis, said handle member adapted to being held by a hand of said operator;
   a lever that engages said handle member and adapted to being held by said operator hand while said lawnmower is running; and
   retainer means interconnected with said lever for retaining said starter rope handle.

2. The handle assembly of claim 1, further comprising:
   stop means attached to said handle member for limiting the movement of said lever.

3. The handle assembly of claim 2, wherein said stop means is a tab attached to said handle member.

4. The handle assembly of claim 1, wherein said handle member is shaped substantially like an inverted U having first and second opposing handle legs.

5. The handle assembly of claim 4, wherein said first handle leg has a first handle leg aperture and said second handle leg has a second leg aperture, and wherein said lever has a first lever leg that rotatably engages said first leg aperture, and said lever has an opposite second lever leg that rotatably engages said second leg aperture.

6. The handle assembly of claim 1, wherein said retainer means includes an aperture through which said starter rope passes.

7. The handle assembly of claim 1, wherein said lever is shaped such that the portion of the lever where said retainer means is located is farther from said handle member than an adjacent section of said lever when said lever is in said run position.

8. The handle assembly of claim 1, wherein said retainer means is located at about the midpoint of said lever.

9. The handle assembly of claim 1, wherein said lever slideably engages said handle member.

10. The handle assembly of claim 4, wherein said lever further comprises:
    a first lever leg that slideably engages said first handle leg;
    a second lever leg that slideably engages said second handle leg; and
    a lever cross member that connects said first lever leg and said second lever leg.

11. The handle assembly of claim 1, wherein said lever rotatably engages said handle member at a single point.

12. The handle assembly of claim 1, wherein said lever has a first end and a second end, and wherein said retainer means is interconnected with said lever near a first end of said lever, and wherein the lever rotatably engages said handle member near the second end of said lever.

13. The handle assembly of claim 1, wherein said lever includes a tab that engages a stop switch contact interconnected with said handle member.

14. The handle assembly of claim 1, wherein said lever is substantially L-shaped.

15. A handle assembly for a lawnmower chassis, the lawnmower having a starter rope and a rope handle attached to the starter rope, said rope handle adapted to being pulled by a lawnmower operator, said handle assembly comprising:
    a handle member attached to said lawnmower chassis and adapted to being held by said operator, said handle member being shaped substantially like an inverted U having first and second opposing handle legs, said first handle leg having a first leg aperture and said second handle leg having a second leg aperture;
    a lever that engages said handle member and moves relative thereto, said lever also adapted to being held by said operator while said lawnmower is running, said lever including
      a first lever leg that rotatably engages said first leg aperture;
      an opposite second lever leg that rotatably engages said second leg aperture; and
    retainer means interconnected with said lever for retaining said starter rope handle.

16. A handle assembly for a lawnmower chassis, the lawnmower having a starter rope and a rope handle attached to the starter rope, said rope handle adapted to being pulled by a lawnmower operator, said handle assembly comprising:
    a handle member attached to said lawnmower chassis, said handle member adapted to being held by said operator;
    a lever that engages said handle member and moves relative thereto, said lever also adapted to being held by said operator when said lawnmower is running; and
    retainer means interconnected with said lever for retaining said starter rope handle;
    wherein said lever is shaped such that the portion of the lever where said retainer means is located is farther from said handle member than an adjacent section of said lever when said lawnmower is running.

17. A handle assembly for a lawnmower chassis, the lawnmower having a starter rope and a rope handle attached to the starter rope, said rope handle adapted to being pulled by a lawnmower operator, said handle assembly comprising:
    a handle member attached to said lawnmower chassis, said handle member adapted to being held by said operator;
    a lever that engages said handle member and moves relative thereto, said lever also adapted to being held by said operator when said lawnmower is running; and retainer means interconnected with said lever for retaining said starter rope handle, said retainer means being located at about the midpoint of said lever.

18. A handle assembly for a lawnmower chassis, the lawnmower having a starter rope and a rope handle attached to the starter rope, said rope handle adapted to being pulled by a lawnmower operator, said handle assembly comprising:
   a handle member attached to said lawnmower chassis, said handle member adapted to being held by said operator;
   a lever that slideably engages said handle member and moves relative thereto, said lever also adapted to being held by said operator when said lawnmower is running; and
   retainer means interconnected with said lever for retaining said starter rope handle.

19. A handle assembly for a lawnmower chassis, the lawnmower having a starter rope and a rope handle attached to the starter rope, said rope handle adapted to being pulled by a lawnmower operator, said handle assembly comprising:
   a handle member attached to said lawnmower chassis, said handle member adapted to being held by said operator and shaped substantially like an inverted U having first and second opposing handle legs;
   a lever that engages said handle member and moves relative thereto, said lever also adapted to being held by said operator when said lawnmower is running, said lever including
      a first lever leg that slidably engages said first handle leg;
      a second lever leg that slideably engages said second handle leg;
      a lever cross member that connects said fist lever leg and said second lever leg; and
   retainer means interconnected with said lever for retaining said starter rope handle.

20. A handle assembly for a lawnmower chassis, the lawnmower having a starter rope and a rope handle attached to the starter rope, said rope handle adapted to being pulled by a lawnmower operator, said handle assembly comprising:
   a handle member attached to said lawnmower chassis, said handle member adapted to being held by said operator;
   a lever that engages said handle member and moves relative thereto, said lever also adapted to being held by said operator when said lawnmower is running and including a tab that engages a stop switch contact interconnected with said handle member; and
   retainer means interconnected with said lever for retaining said starter rope handle.

21. A handle assembly for a lawnmower chassis, the lawnmower having a starter rope and a rope handle attached to the starter rope, said rope handle adapted to being pulled by a lawnmower operator, said handle assembly comprising:
   a handle member attached to said lawnmower chassis, said handle member adapted to being held by said operator;
   a substantially L-shaped lever that engages said handle member and moves relative thereto, said lever also adapted to being held by said operator when said lawnmower is running; and
   retainer means interconnected with said lever for retaining said starter rope handle.

* * * * *

UNITED STATES PATENT AND TRADEMARK OFFICE
CERTIFICATE OF CORRECTION

PATENT NO. : 5,088,273
DATED : February 18, 1992
INVENTOR(S) : DANIEL E. BRAUN ET AL It is certified that error appears in the above-identified patent and that said Letters Patent is hereby corrected as shown below:

Column 8, line 3, CLAIM 19, delete "fist" and substitute therefor ---first---.

Signed and Sealed this

Twenty-fifth Day of May, 1993

Attest:

MICHAEL K. KIRK

*Attesting Officer*  *Acting Commissioner of Patents and Trademarks*